(12) United States Patent
Kandler

(10) Patent No.: US 7,171,849 B2
(45) Date of Patent: Feb. 6, 2007

(54) SENSOR MODULE

(75) Inventor: Michael Kandler, München (DE)

(73) Assignee: Infineon Technologies AG, München (DE)

( * ) Notice: Subject to any disclaimer, the term of this patent is extended or adjusted under 35 U.S.C. 154(b) by 107 days.

(21) Appl. No.: 10/653,653

(22) Filed: Sep. 2, 2003

(65) Prior Publication Data
US 2004/0150499 A1 Aug. 5, 2004

(30) Foreign Application Priority Data
Sep. 2, 2002 (DE) .................. 102 40 446

(51) Int. Cl.
*B60C 23/02* (2006.01)
(52) U.S. Cl. .................. 73/146.5
(58) Field of Classification Search .......... 73/700, 73/146, 760, 862.41, 146.5
See application file for complete search history.

(56) References Cited

U.S. PATENT DOCUMENTS

| 5,635,691 | A | 6/1997 | Ballyns |
| 6,609,419 | B1 * | 8/2003 | Bankart et al. ............ 73/146.5 |
| 6,637,276 | B2 * | 10/2003 | Adderton et al. ........ 73/862.41 |
| 2002/0092364 | A1 * | 7/2002 | Adderton et al. ........ 73/862.41 |
| 2003/0141867 | A1 * | 7/2003 | Inoue ........................ 324/209 |
| 2003/0201044 | A1 * | 10/2003 | Schick .................... 152/152.1 |
| 2004/0082840 | A1 * | 4/2004 | Chen ......................... 600/300 |
| 2004/0234835 | A1 * | 11/2004 | Strobel et al. ................ 429/35 |

FOREIGN PATENT DOCUMENTS

| DE | 198 02 773 A1 | 7/1999 |
| DE | 198 25 761 C2 | 12/1999 |
| DE | 198 54 176 A1 | 5/2000 |
| DE | 201 10 349 U1 | 10/2001 |
| EP | 1 028 463 A1 | 8/2000 |
| EP | 1 186 853 A2 | 3/2002 |
| FR | 2 810 585 A1 | 12/2001 |
| JP | 05 107 141 A | 4/1993 |
| JP | 2000-108622 | 4/2000 |
| KR | 2001 082411 A | 8/2001 |

OTHER PUBLICATIONS

Dirk Jansen et al.: "Projekt Micromechanik-Demonstrator Chip im Reifen, CiR" [project micromechanics demonstrator chip in tire], *IAF-Report*, No. 6, Sep. 20, 2001, pp. 1-32.

(Continued)

*Primary Examiner*—Edward Lefkowitz
*Assistant Examiner*—Andre Allen
(74) *Attorney, Agent, or Firm*—Laurence A. Greenberg; Werner H. Stemer; Ralph E. Locher

(57) ABSTRACT

The invention relates to a sensor module in a flexible housing with integrated transmission means. A possible application of such a flexible sensor module would be the use as transponder-based tire pressure measuring system. Here, the complete module could be vulcanized into the tire, and the data could be transmitted by means of a standardized receiver unit. The transmission may herein be made by radio or inductively, for example.

10 Claims, 1 Drawing Sheet

OTHER PUBLICATIONS

L. Reindl et al.: "Wireless Remote Identification and Sensing with SAW Devices", Proc. IEEE 1998 MMT/AP International Workshop on Commerical Radio Sensor and Communication Techniques, pp. 83-96.

EPCOS: "Main architecture of TPM Systems on the market or in development", *Automotive Electronics: SAW Resonators and Front End Filters Market Study TPMS*, Mar. 2001, 20 pgs.

M. Tewes et al.: "Wireless Tyre Sensors Based on Amorphous Magneto-Elastic Materials", in Sven Krueger (ed.) et al.: "Advanced Microsystems for Automotive Applications 2001", *Springer Verlag*, Berlin, 2001, pp. 83-87, describes wireless tire sensors based on amorphous metal-elastic materials.

Volker Bachmann et al.: "Future Car-Tires as Provider of Information for Vehicle Systems to Enhance Primary Safety", *Society of Automotive Engineers, Inc.*, paper No. 981944, Aug. 1998, pp. 67-73.

Markus Fach et al.: "Der Darmstädter Reifensensor im Labor und am Fahrzeug" [the Darmstadt tire sensor in the laboratory and in the vehicle], pp. 138-149, no publication data available.

Bert Breuer et al.: "Der Darmstädter Reifensensor—Ein Instrument Zur Messung Dynamicher Grössen Im Rotierenden Rad" [the Darmstadt tire sensor—an instrument for measuring dynamic values in a rotating wheel], *TU Darmstadt, Thema Forschung*, No. 1/98, pp. 24-31.

V. Bachmann: "Untersuchungen zum Einsatz von Reifensensoren im PKW" [research on the use of tire sensors in passenger motor vehicles], *Fortschrittsberichte VDI*, vol. 12, No. 381, Düsseldorf 1999, pp. 2-77.

Johannes Seiler: "Ein Sensor im Reifen erkennt Glätte" [a tire sensor recognizes ice], http://www.general-anzeiger-bonn.de/news/artikel.php?id=43742, Aug. 2, 2002.

Rainer Großmann: "Projekt: Reifendruckmessung mit. Schwingquarzen" [project: measuring tire pressure by using oscillating crystals], Aug. 2, 2002, http://www.emt.ei.tum.de/kollegen/grosmann.html.

"Ausgezeichnet: Reifen mit Sensor" [Awarded: tires with sensor], Feb. 8, 2002, http://www.3sat.de/tips/mobil/28900/index.html?.

Continental AG: "Der 'intelligente' Reifen" [the intelligent tire], Aug. 2, 2002, http://www.conti-online.com/generator/www/con/de/continental/portal/allgemein/innovationen/inno_swt_de.html.

* cited by examiner

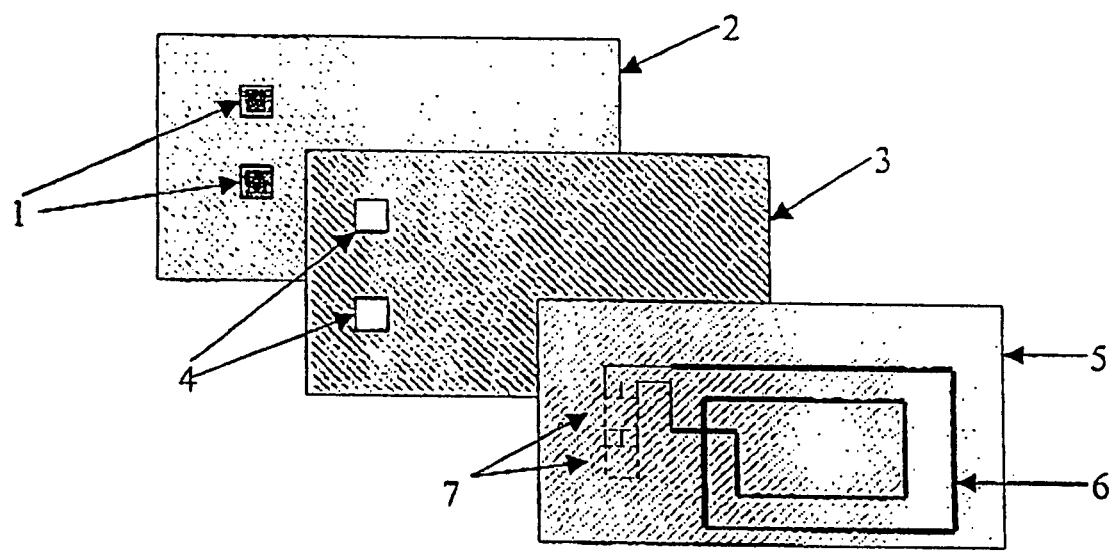

SENSOR MODULE

BACKGROUND OF THE INVENTION

1. Field of the Invention

The present invention relates to a module made of one or more semiconductor sensors, such as a temperature sensor, a tire pressure sensor, an acceleration sensor, a rotation speed sensor, a steering angle sensor, etc., in a flexible housing as it can, among other things, be vulcanized into rubber tires.

2. Description of the Related Art

In order to increase the operational safety of vehicles of all kinds, the development of technical assemblies for monitoring most varied properties of the wheels and tires has been worked on for a long time. In this context, properties to be monitored can be the temperature, the internal pressure, the deformation, the acceleration, the tilt angle etc. of the wheels or tires. Changes on the wheels and tires caused by the usage and wear are to be recognized to avoid accidents or at least minimize the risk of accidents. Especially in the area of passenger transport, such as at aircraft tires, bus tires, or railway wheels monitoring the tires and wheels could bring much more safety.

From Proc. IEEE 1998 MMT/AP International Workshop on Commercial Radio Sensor and Communication Techniques, pages 83 to 96, the use of surface wave sensors for the detection of the deformation of the tires is known. The cause of the deformation, however, such as temperature, internal tire pressure, or outside influences, are not detected herewith. The detected signal may then be transmitted to a vehicle mounted receiver unit in a wireless manner, for example inductively or by radio.

Another solution for the detection of the tire deformation is described in EP 1 186 853 A2. Here, the profile is impressed into the side wall of the rubber product, and the deformation of this profile by influences, such as internal tire pressure or also outside influences, for example by the road conditions, is measured in various ways. Possible principles for the detection of the profile deformation are the capacitive measurement, the optical measurement, measurement by ultra-sound, and also the measurement by eddy current.

Independent of the kind of the implementation of the sensor in the tire, the requirement every system has to meet is the wireless transmission of the measurement data from the wheel or tire to the vehicle. Suitable transmission methods hereof are the inductive transmission, the transmission by means of electromagnetic waves in the infrared region, or also the transmission by radio.

Due to the high weight and rigidity of the housing, the sensors are in most cases currently being mounted near the rim. The current supply, for example by means of batteries, or the assemblies for the wireless data transmission, such as induction coils or antennas, currently also have to be worked into the tire element separate from the sensor itself.

SUMMARY OF THE INVENTION

It is the object of the present invention to provide a sensor module in a flexible housing, wherein the transmission means is integrated in the module. Furthermore, a method for the production of such a sensor module is provided.

The present invention is a sensor module having at least one sensor element that is at least partially surrounded by a housing, wherein the housing of the module is flexible, and a transmission means for wireless data transmission is integrated in the module.

The present invention is a method for the production of a sensor module with at least one sensor element, wherein the sensor elements are mounted on a flexible support material and are contacted via a flexible cover.

In a sensor module of the aforementioned kind, this object is inventively achieved by disposing one or more detector elements and at least one means for data transmission in a flexible housing.

Depending on requirements of the application, due to the spatial conditions, it may be required to adapt the flexible housing of the sensor module to the geometry. Accordingly, in an advantageous embodiment of the invention, the shape of the housing is adapted to the geometry of the tire or the tire profile.

In one embodiment of the invention, it is intended to strengthen the sensor module in the area of the sensors, i.e. the semiconductor devices, to increase the mechanical stability of the module.

In another embodiment of the invention, a memory element for storing specific data is integrated in the flexible housing of the sensor module. A possible application of this memory element in the sensor module could be the identification of tires. Data, such as date of purchase, tire dealer, number of kilometers covered, vehicle owner, etc., may be stored on this memory element, and thus be made available to garages or the user for technical inspection.

In an especially advantageous embodiment of the invention, the power for the operation of the sensor module is inductively coupled in. This method has the advantage that no costly and maintenance-intensive supply elements have to be accommodated on the module.

For the production of an inventive sensor module as well as advantageous embodiments, a film serving as a stand-off with recesses for the semiconductor device(s) is glued onto a support foil or film. Subsequently, the semiconductor devices are mounted in the so developed chip islands. By means of known flip-chip technology the semiconductor devices are electronically contacted via a metalized cover film. In this method, the transmission elements, such as antenna or coil, are also integrated in the metalized cover foil, and are contacted via traces with the semiconductor devices.

In an embodiment of the inventive method, instead of the two-component support film with stand-off, a support film with depressions for the semiconductor devices is used. The pressure sensor chip(s) or, if necessary, further semiconductor devices may then be introduced into these depressions, and again be contacted via a metalized and structured cover film.

In a further embodiment of the inventive production method, pressure sensors are introduced into the module as semiconductor devices, and are provided with a drop of gel prior to applying the metalized cover foil in order to enhance the pressure coupling to the pressure sensor(s).

BRIEF DESCRIPTION OF THE DRAWINGS

These and other objects and features of the present invention will become clear from the following description taken in conjunction with the accompanying drawing, in which:

FIG. 1 shows components of a sensor module with a flexible housing.

DESCRIPTION OF THE PREFERRED EMBODIMENTS

FIG. 1 shows an exemplary embodiment of a sensor module with a flexible housing. The sensor module according to FIG. 1 consists of a support film 2, a stand-off 3, said stand-off 3 having recesses that can accommodate the sensor element(s) 1, and a metalized cover film 5 with contact element 7 and an integrated transmission element 6. Depending on the application of the sensor module, one or more semiconductor devices and/or sensors may be integrated in the module. Likewise, it is also possible to integrate signal processing integrated circuits apart from the sensors in the module. Depending on the spatial condition, the operating voltage may be generated in the module itself, e.g. by means of batteries, or inductively coupled in.

In an advantageous method for the production of the sensor module illustrated in FIG. 1, the film 3 with its recesses for the accommodation of the sensor/semiconductor devices is applied onto a support film 2. In these recesses, the sensor elements 1 are mounted. In order to establish the mechanical and thermal contact, a fixing agent is required that adheres to both the semiconductor body, e.g. silicon, and the support material, the film. For example, epoxy or silicon-based glues are suitable, if necessary with an activator previously applied to the film. The so-far produced module is then completed with a cover and contact film 5. Said cover and contact film 5 is coated with a conductive and suitably structured layer, e.g. aluminum or copper, so that both the sensor/semiconductor elements 1 may be contacted and the transmission means 6, e.g. the antenna, is already realized by the conductive layer.

Instead of the film 3 utilized as stand-off, it is also possible to use a support film with integrated depressions for the accommodation of the semiconductor devices.

A possible application of such a flexible semiconductor module would be the use as transponder-based tire pressure measuring system. Here, the complete module could be vulcanized into the tire, and the data could be transmitted by means of a standardized receiver unit. The transmission may herein be made via radio or inductively, for example. Apart from sensor elements, other semiconductor devices, such as signal processing integrated circuits, may also be integrated in the sensor module. Such signal processing circuits then have the task to process the signals of various sensors, for example temperature, pressure, or humidity sensors, or also calibration data of the sensors, in order to have to transmit only one signal incorporating all the information to the receiver unit. Likewise, it is possible to integrate, apart from the sensor elements, memory elements in the sensor module. In such storage modules, information, such as identification numbers, age features, mileage readings, date of purchase, dealer, etc., could then be held.

What is claimed is:

1. A sensor module comprising at least one sensor element that is at least partially surrounded by a housing, wherein the housing of the module is flexible, and a transmission means for wireless data transmission is integrated in the module, the flexible housing including at least two flexible foils, a first one of the flexible foils supporting the at least one sensor element and a second one of the flexible foils overlapping the first one of the flexible foils and supporting the transmission means.

2. The sensor module of claim 1, wherein the transmission means contains an antenna and/or an induction coil.

3. The sensor module of claim 1, wherein an operational voltage for the sensor module is inductively coupled in.

4. The sensor module of claim 1, wherein the operational voltage for the sensor module is electromagnetically coupled in.

5. The sensor module of claim 1, wherein the flexible housing is designed so that it may be vulcanized into a rubber tire.

6. The sensor module of claim 1, wherein the flexible housing is adapted to the geometry of a receiving unit.

7. The sensor module of claim 1, wherein the sensor module incorporates a memory element configured to store specific data that is not data sensed by the sensor element.

8. The sensor module of claim 1, wherein the sensor element is a pressure sensor and the entire sensor module is inductively operated.

9. The sensor module of claim 8, wherein a gel is introduced between the flexible cover and the pressure sensor.

10. A method for producing a sensor module with at least one sensor element, the method comprising:
providing at least one sensor element being at least partially surrounded by a flexible housing; and
integrating transmission means for wireless data transmission into the module, the flexible housing including at least two flexible foils, a first one of the foils supporting the at least one sensor element and a second one of the foils overlapping the first one of the foils and supporting the transmission means.

* * * * *